(12) United States Patent
Rubino, III

(10) Patent No.: US 6,243,356 B1
(45) Date of Patent: Jun. 5, 2001

(54) SCREWING ACTION PLAYABLE COMPACT DISC CASE

(76) Inventor: Vincent James Rubino, III, 54 Rumson Rd., Livingston, NJ (US) 07039

( * ) Notice: Subject to any disclaimer, the term of this patent is extended or adjusted under 35 U.S.C. 154(b) by 0 days.

(21) Appl. No.: 09/345,210

(22) Filed: Jun. 30, 1999

Related U.S. Application Data

(63) Continuation-in-part of application No. 08/845,806, filed on Apr. 30, 1997, now abandoned.

(51) Int. Cl.[7] .................................................. G11B 7/24
(52) U.S. Cl. ........................................ 369/291; 206/308.1
(58) Field of Search ........................... 369/291; 360/133; 206/308.1, 308.3, 309

(56) References Cited

U.S. PATENT DOCUMENTS

| | | | |
|---|---|---|---|
| 3,961,656 | * 6/1976 | Aggarwal | 206/309 |
| 4,185,313 | * 1/1980 | Green et al. | 360/133 |
| 4,458,282 | * 7/1984 | Mui et al. | 360/133 |
| 4,556,968 | * 12/1985 | Pelkey et al. | 369/287 |
| 4,879,710 | 11/1989 | Ijima | 369/291 |
| 5,476,173 | * 12/1995 | Opresco | 206/309 |
| 5,542,532 | * 8/1996 | Mitchell | 206/308.1 |
| 5,677,818 | 10/1997 | Ma et al. | 360/133 |
| 5,725,931 | 3/1998 | Landin | 428/134 |
| 5,757,765 | 5/1998 | Chen | 369/283 |
| 5,774,447 | * 6/1998 | Shtipelman et al. | 369/291 |
| 5,787,069 | 7/1998 | Lowe et al. | 369/291 |
| 5,912,875 | 6/1999 | Lowe et al. | 369/275.5 |
| 5,922,430 | * 7/1999 | Biddlecome | 428/66.6 |
| 6,077,583 | * 6/2000 | Park | 428/1 |

FOREIGN PATENT DOCUMENTS

| | | |
|---|---|---|
| 0300733A1 | 1/1989 | (EP) . |
| 0599655A1 | 6/1994 | (EP) . |
| 2217507A | 1/1995 | (GB) . |
| 2279799A | 11/1995 | (GB) . |
| WO96/21928 | 7/1996 | (GB) . |
| WO94/14161 | 6/1994 | (WO) . |

* cited by examiner

Primary Examiner—Brian E. Miller
(74) Attorney, Agent, or Firm—Mathews, Collins, Shepherd & Gould, P.A.

(57) ABSTRACT

The case comprises two circular sections comprising a bottom portion that has a readable surface and sidewalls and a top portion that has grooves that mesh with complimentary grooves in the sidewalls of the bottom portion. Holes in the top portion of the case or other gripping means are used to screw the top section into the bottom section closing the space between the Compact Disc and the case and successfully creating a protective cover capable of being played in a Compact Disc, DVD or other optical media reader. The case can be disassembled and the disc easily removed by unscrewing the case and lifting out the disc. There is also no need for a special applicator or for a special instrument to remove the disc.

13 Claims, 3 Drawing Sheets

SCREWING ACTION PLAYABLE COMPACT DISC CASE

CROSS REFERENCE TO RELATED APPLICATIONS

This application is a continuation-in-part of Ser. No. 08/845,806, filed Apr. 30, 1997 abandoned.

BACKGROUND OF THE INVENTION

The present invention relates to a device for the protection of optical disc media such as CD- Audio, CD-ROM, CD-R and DVD, referred to herein collectively, but without limitation as "optical discs," CD refers to compact disc. The terms disc and disk are use herein interchangeably. A standard CD disc has a diameter of approximately 120 millimeters (mm), a thickness of approximately 1.2 mm and a weight of approximately 14–33 grams and a center hole diameter of approximately 15 mm. A standard CD disc is constructed of a layer of reflective aluminum or gold situated on a clear polycarbonate disc base. The base layer of the polycarbonate is stamped with small indentations referred to as "pits." A standard CD has a space approximately 1.5 mm in width at the outer and inner edge surrounding the area where data is stored. The top polymer layer of polycarbonate covers the opposite side of the aluminum layer and is referred to as a "lacquer." A standard CD player shines a laser beam through the polycarbonate and reflects the laser light off of the aluminum layer. The pits permit the variations in the reflected laser light to be interpreted as binary code. A CD-R compact disc drive works in a similar manner, except that the pits are formed in a layer of dye rather than in the polycarbonate layer and that a layer of gold is substituted for the reflective aluminum layer. In each case the optical transmission reflection of the optical disc clarity of the laser light is of paramount importance to the efficient operation of the disc and its player.

Optical discs are often packaged with rectangular plastic cases commonly referred to as "Jewel Boxes" or "Jewel Cases." The optical disc must be removed from these cases prior to insertion and play in the disc player, thus exposing the optical disc to damage, such as scratching or accretion of dirt or foreign matter. The present invention provides a protective covering which may be applied and removed without damage or alteration of the optical disc, but which need not be removed prior to use of the optical disc in its player. The present invention differs fundamentally and significantly in its design and purpose from Jewel Box type cases. The present invention also differs significantly in concept and design from cartridge type disc cases and mechanisms in which an optical disc is inserted into a fixed cartridge in which the disc spins, but the cartridge remains relatively fixed within the player.

The prior art also discloses protective covers comprised of protective sheets which are attached to the optical disc throughout adhesive strips or rings such as in Iijima's U.S. Pat. No. 4,879,710. However, as noted by Burroughs in the UK Patent Application No. GB 2,279,799A such an invention is likely to permit air to be trapped between the disc and the covering such that differences in refraction could cause read errors in the playing mechanism. The Burroughs Application also discusses European patent Application No 0 300 733 A1 which uses a heat shrink process to cover the optical disc. Burroughs notes the possible damage to the disc from the heating process and the difficulty of application by non-experts. Also disclosed in the Burroughs Application is British Patent Application No. 2 217 507 A which utilized a protective shield applied to the non-read side of the disc through the use of adhesive gum and an external applicator device. The Burroughs Patent Application itself seeks to resolve these short comings by proposing the use of a protective shield assembly with a uniform coating of fluid adhesive material or refractive index matching liquid with that of the disc itself. Burroughs proposes to construct the shield casing from polycarbonate or acrylic resins. Burroughs also requires the imposition of a protective ring around the periphery of the optical disc, purportedly to protect the disc, but more obviously required to keep the fluid from escaping and damaging the disc.

The drawbacks of the Burroughs system are numerous. The fluid is likely to become contaminated during application thereby interfering with the laser's ability the read the pits in the disc. In addition, the fluid is likely to escape during high-speed rotation of the disc causing damage to the player. Burroughs also fails to provide any increased measure of protection from damage or scratching, since the shield would be made of the same substance as the outer layer of the disc. The reflective rim proposed by Burroughs supposes yet another component which is likely to come loose during disc play and is likely to damage the player and the disc if spun off during high speed rotation.

U.S. Pat. No. 5,757,765 to Chen seeks to overcome the short comings of Iijima and Burroughs through the use of an annular adhesive sheet with a peelable releasing sheet, and radially extending ribs, through which the disc shield is attached to the inner portion the optical disc surface. The shield itself is referred to as a film with a thickness smaller than sixty micrometers. Such a device does not address the tendency of the sheeting to vibrate and pull away from the optical disc in places where the adhesive radial ribs are not affixed or where they have become worn. The Chen device also does not provide a substantial layer capable of protecting the disc from scratches by other objects, but rather supposes a film type sheet with minimal protective quality is similar to a dust cover.

U.S. Pat. No. 5,787,069 to Lowe, et al. discloses a disc cover (trademarked as CD ARMOR) with clasps along the outer edge to hold the cover together. The clasps are likely to hold poorly and tend to be uneven with hand assembly. This design is subject to warping especially when the edges are folded in the applicator disclosed by Lowe, et al. in U.S. Pat. No. 5,912,875.

SUMMARY OF THE INVENTION

The present invention is a protective optical disc case which includes a substantially circular top portion having threads along its circumference; a substantially circular and flat bottom portion with a sidewall along its circumference, the sidewall having an inner side with a inner diameter large enough to house an optical disc having a particular thickness, said inner side having threads, and having an outer side with a outer diameter small enough to fit in the disc player, wherein said flat bottom portion is optically transparent to light of the frequency, and comprise a substantially rigid material; wherein the top portion when threaded into the bottom portion defines the disc case; at least one of the top portion and the bottom portion having an aperture to allow the optical disc player rotation means to rotate the disc case; wherein the top portion when threaded into the bottom portion varies the thickness of the protective optical disc case such that the protective optical disc case conforms exactly to the particular thickness of the optical disc to compensate for variances in thickness of various optical discs such that the protective optical disc case will not substantially rotate independently of the optical disc.

DETAILED DESCRIPTION

Figure 1:
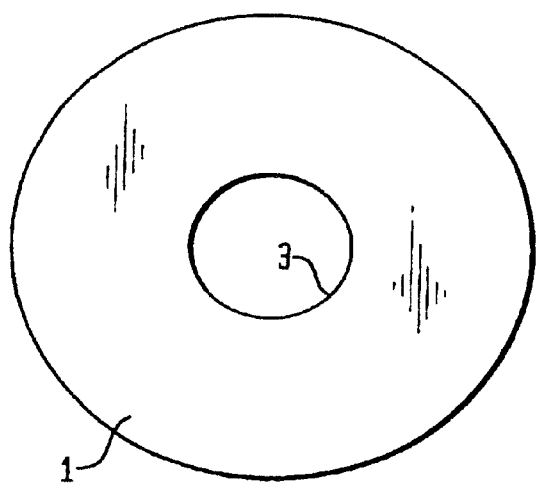
FIG. 1 shows an overhead view of the top portion 1 of the case, with an opening and inner edge 3.

The present invention provides a substantial scratch resistant protective covering, with high optical quality, but without the use of fluids, or adhesives on the annular disc surfaces. The present invention further provides a secure covering which will adjust with variations in the thickness of the optical disc to which it is applied and which will remain secure during high speed rotation, without flapping or disassembly likely to occur in other devices. Stops, ledges, or other physical means can define the lower thickness limit.

The Screwing Action Playable Compact Disc Case is a circular case that covers a Compact Disc, Digital Video Disc, and similar optical disc media, including but not limited to CD-ROM, CD-R, and DVD (referred to collectively, but not by way of limitation as "optical discs"). This case can also be used for some hybrid discs (e.g., opto-magnetic). The case is constructed so that it is strong, yet light enough to be played in an optical device with variable and/or high rotation speeds. The case is also made of a material capable of having good optical quality (e.g., high transmission of laser light, low reflectivity) such that the case will not interfere with the reading of the media by the player. Standard CD-ROM players use 780 nm (i.e., red) lasers. Newer optical players will use shorter wavelengths such as blue-green and blue. Optical materials such as protective playable cases must not absorb much of this laser light. One good transparent material is sapphire-coated polycarbonate. This material is strong, light, and scratch resistant and allows for good optical quality, for use on the read side(s) of such disc cases. Another suitable construction material is a strong, light and transparent polycarbonate. Any rigid polymer transparent at the frequency of the laser can be used. Such polymers can include, but are not limited to, poly(diethyleneglycol) bis allyl carbonate (tradenamed CR-39), and bisphenol A based polycarbonates, thermoset allyl diclycol carbonate (ADC), polymethyl pentane, dicyclopentadiene resin, acrylic resins, and polymethyl methacrylate (PMMA). Composites such as glass-polymer composites are also envisioned.

The case can be transparent mainly to the laser light of the disc player, can be transparent to the naked eye, can be selectively transparent (e.g., transmitting light from only one laser from a multiple laser disc player), or can have changeable transparency (e.g., become transparent only after ultraviolet (UV) radiation).

Examples of a few representative antiscratch or anti abrasion coatings include polymerizable unsaturated monomers polymerized and crosslinked in site by heating at high temperatures, from 80° C. to the glass transition temperature ($T_g$) of the substrate in the presence of radical polymerization initiators, thin films deposited by physical (PVD) or chemical vapor deposition (CVD) such as alumina or titanium nitride. Other coatings typically used for plastic optics are envisioned such as antireflection coatings (i.e., thin dielectric films), adhesion promoters, and coatings to modify the refractive index. Multiple coatings of various types can be used. The shape of the surface can also be modified with fresnel or similar free standing optics.

Figure 2:
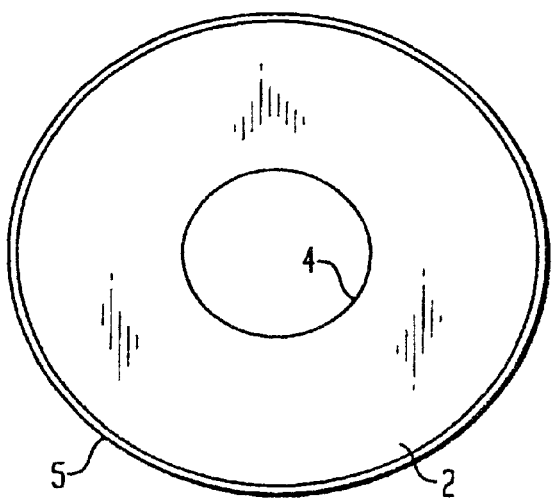
FIG. 2 shows an overhead view of the bottom portion 2 of the case, with an inner edge 4, and sidewall 5.
Figure 3:
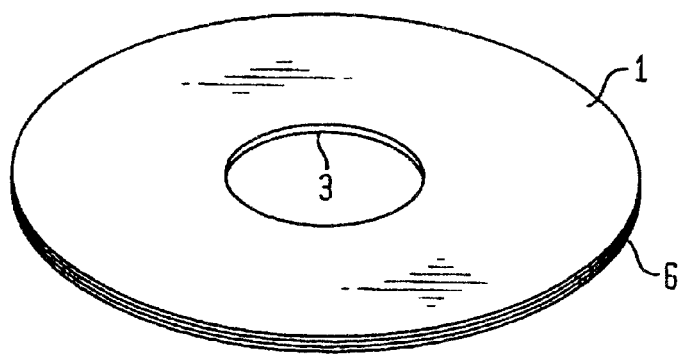
FIG. 3 shows a perspective view of the top portion 1 of the case, with an opening and inner edge 3, and grooves in outer edge 6.
Figure 4:
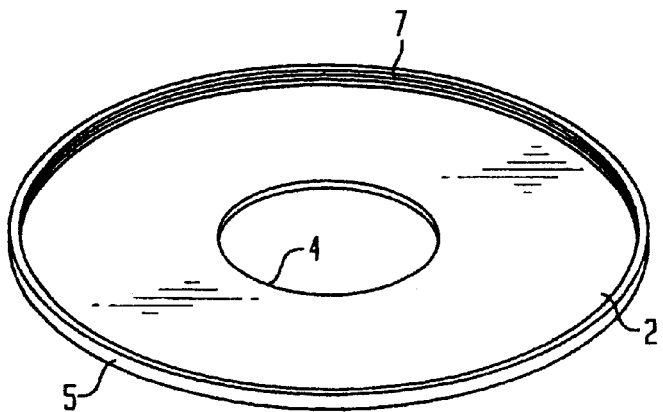
FIG. 4 shows a perspective view of the bottom portion 2 of the case, with a hole and inner edge 4, sidewall 5, and grooves in sidewall 7.
Figure 5:
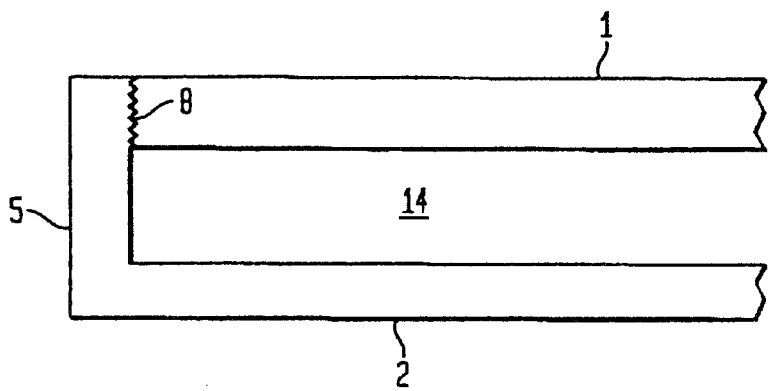
FIG. 5 shows a partial view of cross section of case assembly with top portion 1 and bottom portion 2 engaged through grooves engaged at 8. A space for disc chamber 14 suitable for holding an optical disc, which is defined by space between the top 1, bottom 2, and sidewall 5.
Figure 6:
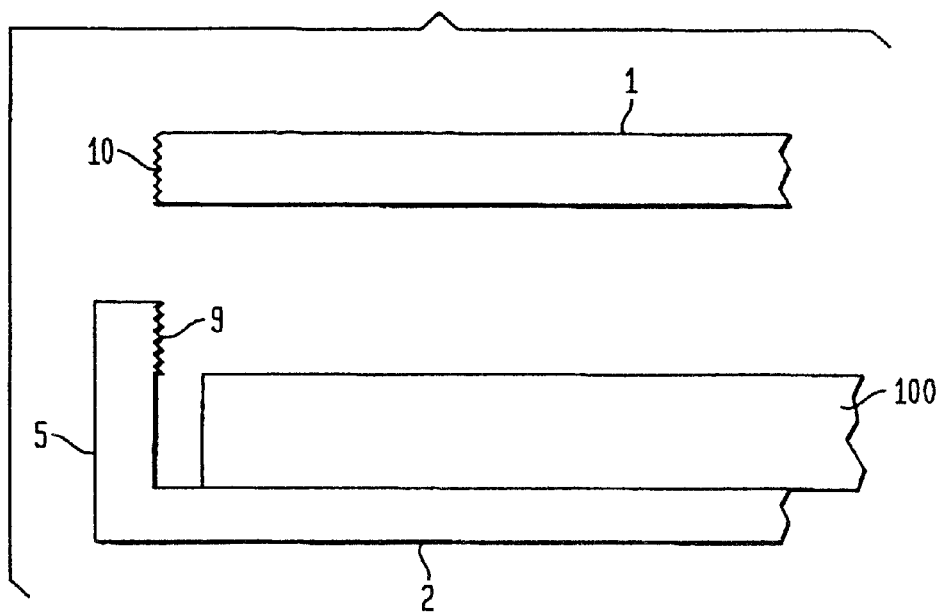
FIG. 6 shows an exploded view of a partial cross section of case assembly with top portion 1, bottom portion 2, and sidewall 5, with a lateral view of grooves 9 in bottom, lateral view of groove 10 in top, and optical disc 100.
Figure 7:
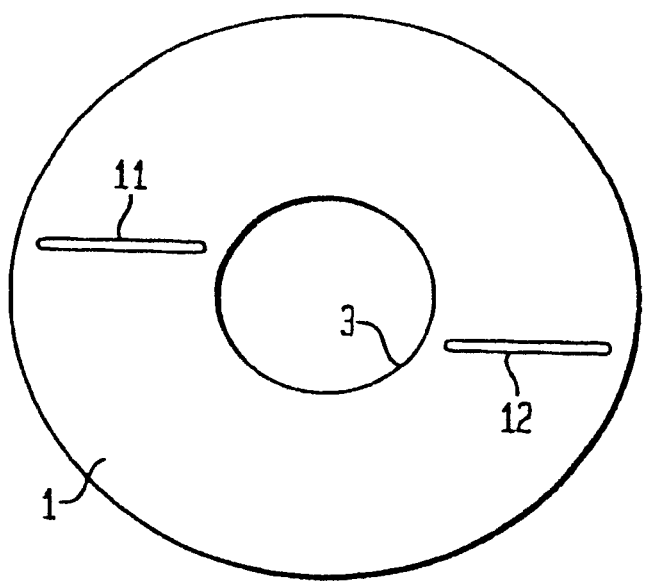
FIG. 7 shows an overhead view of top portion 1 with optional gripping surfaces 11 and 12.
Figure 8:
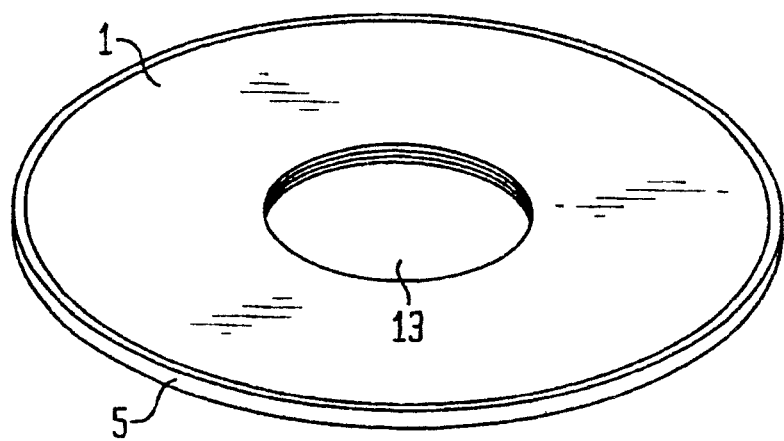
FIG. 8 shows a perspective view of case assembly with top portion 1 engaged at sidewall of bottom portion 5, with a hole at 13.

Referring to FIG. 1 there is shown an overhead view of the top portion 1 of the protective optical disc case having an inner edge 3 defining an opening. Referring to FIG. 2 there is shown an overhead view of the bottom portion 2 of the protective optical disc case having an inner edge 4 and a sidewall 5. Referring to FIG. 3 there is shown a perspective view of the top portion 1 of the protective optical disc case having a sidewall 5 and an inner edge 4. The inner edge 4 defines an opening. The sidewall 5 contains grooves 7. Referring to FIG. 5 there is shown a partial cross sectional view of the protective optical disc case, wherein grooves 8 engage the top portion 1 and the bottom portion 2. The top portion 1, the bottom portion 2 and the sid wall 5 define a disc chamber 14 suitable for holding an optical disc. Referring to FIG. 6 there is shown an exploded view of the partial cross section of FIG. 5. The bottom portion 2 has grooves 9 and the top portion 1 has grooves 10. The disc chamber 14 contains an optical disc 100. Deferring to FIG. 7 there is shown an overhead view of the top portion 1 containing optional gripping surfaces 11 and 12. Referring to FIG. 8 there is shown a perspective view of the protective optical disc case with the top portion 1 engaged with the bottom portion 2. The protective optical disc case has a opening 13 defined by inner edges 3 and 4.

The case has an inner diameter slightly larger, approximately 102%) than the diameter of the disc which it is to encase (e.g., a case for a CD or CD-R would have an inner diameter of 122 mm+/−2% (slightly longer than a standard CD). The faces of the case which cover the top and bottom faces of the disc has a conforming shape such that any notches or rings employed for grasping of the disc by the player spindle would be replicated in the case to allow it to be properly seated and grasped by the player, with a concomitant groove in the inner surface of the case to seat the disc without any significant gaps, between the disc and case surface. The holes may be the same diameter or slightly larger in diameter to the hole in the disc which is being encased. For a standard CD the case is less than or equal to approximately 3 mm thick with one CD inside. The case would add a thickness of up to approximately 120% of the thickness of the disc. The case adheres to the disc media through the use of grooves on the top and bottom portions of the disc case. The grooves on the bottom portion are located along the sidewalls. The grooves and protrusion on the top portion are located on the inner face of the first casing part in order to mesh with the grooves in the sidewalls of the second part. The grooves, threads or protrusions that can grasp the threads can be integral to the case, can be inserts such as metal, or can be modified to improve their hardness or accuracy. Any thread shape known in the thread and screw art is contemplated. The cut of thread in the top portion does not have to be the same as the cut or continuity of the thread in the bottom portion. The grooves or threads may be located along the outer edge and for discs having center holes, optionally, along the inner edge. On cases covering one sided media (e.g., certain CD-ROM) there may be optional gripping areas on the non-read side of the case to enhance gripping by the user for screwing the top and bottom portions together. Alternatively the edge of the case is grippable by the user. The top and bottom portions of the case screw together to allow the disc media to be held tightly in position without air gaps that would cause light scattering or inconsistent reading of the disc. Air gaps on the order of about 50–5,000 nanometers (nm) are most problematic.

This design is superior to a simple snapping on mechanism for many reasons. For a case to snap on properly to the disc and provide room for a top covering segment, the sidewalls of the bottom segment would have to comprise a ridge that would be too thick to function in most media players. The screwing action also allows the case to conform exactly to the thickness of the disc media to compensate for variances present in the thickness or flatness of the disc media, even among discs of the same type. This can be used to salvage some warped discs. The screwing mechanism eliminates the small space which could cause read errors or become unstable in the case. With the correct handed threads, the screwing feature also has the ability to become more secure and thereby make the case stronger with each revolution of the case in the media player.

The screwing case is also easily removable from the disc it protects. The removal or opening of a snap on case, fluid media case or glued case could case damage to the disc or its player. The screw type case avoids the deformation of the case, which occurs in the snap on or glued cases which makes them difficult or impossible to reuse. The screw type case avoids these problems and provides enhanced reusability and easy replacement. An openable case is the preferred embodiment, though a non-openable or selectively openable version is also envisioned. For example a non-openable case could reduce theft of expensive discs. A special player or adapter could be required to open or play the case with disc.

The Screwing Action Playable CD Case is a circular case that covers a Compact Disc, Digital Video Disc ("DVD"), and similar disc media, including but not limited to CD-ROM, CD-R, and DVD (referred to collectively, but not by way of limitation as "optical discs"). The case is constructed so that it is strong, yet light enough to be played in an optical device that functions at high speeds. The case would have an inner diameter slightly longer, approximately 102%) than the diameter of the disc which it is to encase (e.g., a case for a standard CD or CD-R would have an inner diameter of 122 mm+/–2% (slightly larger than a standard CD). The faces of the case which cover the top and bottom faces of the disc would have a conforming shape such that any notches or rings employed for grasping of the disc by the player spindle would be replicated in the case to allow it to be properly seated and grasped by the player, with a concomitant groove in the inner surface of the case to seat the disc without any significant gaps, between the disc and case surface. The holes may be the same diameter or slightly larger in diameter to the hole in the disc which is being encased. The case is approximately 3 mm thick with one CD inside. The case adheres to the disc media through the use of grooves on the top and bottom portions and/or the edges of the disc case. The grooves on the bottom portion are located along the thin sidewalls. The grooves and protrusion on the top portion are located on the inner face of the casing in order to mesh with the grooves in the sidewalls of the bottom segment. On cases covering single read sided media there may be optional gripping areas (e.g., grooves or at least one high friction surface) on the non-read side of the case to enhance gripping by the user for screwing the top and bottom sections together. Alternatively the edge of the case is grippable by the user. The top and bottom portions of the case screw together to allow the disc media to be held tightly in position without significant air gaps.

The screwing action allows the case to conform exactly to the thickness of the disc media to compensate for variances present in the thickness of the disc media, even among discs of the same type. The screwing mechanism eliminates the small space which could cause read errors or become unstable in the case. The screwing feature also has the ability to become more secure and thereby make the case stronger with each revolution of the in the media player. The screwing case is also easily removable from the disc it protects. The removal of a snap on case, fluid media case or glued case could case damage to the disc or its player, and avoids the deformation of the case which occurs during case assembly.

Holes or variations in thickness are contemplated to reduce weight of the disc case while maintaining even weight distribution from its center. Only movements that do not seriously damage the disc are contemplated. The disc and the disc case are contemplated not to move in relation to each other during disc play to minimize damage to the disc. There can be movement during other operations such as assembly and disassembly.

Accordingly, it can be seen that this invention is in effect a stronger, more reliable disc case than any previous storage medium. The disc can be read easily through a strong, scratch resistant case that is fixed onto the disc through the use of a screwing mechanism. At least part of the case must be rigid enough to avoid warping. This case is sturdier than the prior art because the screwing mechanism allows the case to vary its size according to the slightly varying sizes of individual compact discs. This efficient use of space allows the disc to be properly read in a high-speed disc drive along with re-writeable disc drives. The screwing mechanism also makes the compact disc stronger and produces the least risk of damaging the disc when removing the case. The invention is cost efficient and can be easily removed and replaced if it becomes scratched or damaged in any way.

Although the description above contains many specificities, these should not be construed as limiting the scope of the invention but as merely providing illustrations of some of the presently preferred embodiments of this invention. Various other embodiments and ramifications are possible within it's scope. For example, the sidewalls can be located on either the readable or nonreadable sides of the case. The other side of the case could have threads on its outer edge. The case can also be made to fit any circular optical medium, even larger laser discs, mini-compact discs, which can be less than half the size of a standard compact disc, and DVD discs. This invention is also useful in schools and libraries where optical discs are becoming more commonly used for education and entertainment purposes, and are in constant danger of being damaged by the many hands they come in contact with.

Thus the scope of the invention should be determined by the appended claims and their legal equivalents, rather than by the examples given.

I claim:

1. A protective optical disc case for an optical disc having a particular thickness that is able to fit into a disc player, comprising:
   a substantially circular top portion having threads along its circumference;
   a substantially circular and flat bottom portion with a sidewall along its circumference,
      said sidewall having an inner side with a inner diameter large enough to house the optical disc, said inner side having threads, and having an outer side with a outer diameter small enough to fit in the disc player,
      wherein said flat bottom portion is optically transparent to light of the frequency, and comprises a substantially rigid material;
   wherein the top portion when threaded into to the bottom portion defines the disc case;
   at least one of the top portion and the bottom portion having an aperture to allow the optical disc player rotation means to rotate the disc case;
   wherein the top portion when threaded into the bottom portion varies the thickness of the protective optical disc case such that the protective optical disc case conforms exactly to the particular thickness of the optical disc to compensate for variances in thickness of various optical discs such that the protective optical disc case will not substantially rotate independently of the optical disc.

2. The protective optical disc case according to claim 1, wherein the top portion and the bottom portion comprise polycarbonate.

3. The protective optical disc case according to claim 1, wherein the top portion and the bottom portion are both transparent.

4. The protective optical disc case according to claim 1, wherein only the bottom portion is transparent.

5. The protective optical disc case according to claim 1, wherein the bottom portion is opaque.

6. The protective optical disc case according to claim 1, wherein the inner diameter is approximately 121 to approximately 122 mm.

7. The protective optical disc case according to claim 1, wherein the thickness of the substantially circular and flat bottom portion is a relatively uniform thickness in the range of 0.1 mm to 0.8 mm.

8. The protective optical disc case according to claim 1, wherein the bottom portion is intrinsically substantially scratch resistant or has an antiabrasion coating.

9. A playable case for an optical disc having a particular thickness, comprising:
   a substantially circular top portion comprising a circular substantially planar section and a grasping sidewall along the outer circumference of the circular substantially planar section; and
   a substantially round circular bottom portion comprising a substantially planar essentially dry and substantially optically transparent section and a threaded sidewall along the outer circumference of the substantially planar section,
   wherein the grasping sidewall can holdingly engage the threaded sidewall and vary the thickness of the playable case such that the playable case conforms exactly to the particular thickness of the optical disc to compensate for variances in thickness of various optical discs such that the playable case will not substantially rotate independently of the optical disc.

10. A playable case according to claim 9, wherein the grasping sidewall is threaded.

11. A playable disc assembly for use with a disc player comprising;
   an optically readable disc having a particular thickness;
   said optically readable disc disposed between a substantially round top portion and a substantially round bottom portion;
   said top portion containing a first aperture;
   said bottom portion containing a second aperture; and
   wherein said bottom portion defines a substantially planar surface, said entire surface being essentially dry and optically transparent wherein said top portion when threaded into said bottom portion varies the thickness of the playable disk assembly to conform exactly to the particular thickness of the optically readable disc to compensate for variances in thickness of various optical discs such that said top portion and said bottom portion will not substantially rotate independently of the disc.

12. The playable disc assembly according to claim 11, wherein the top portion includes at least one aperture.

13. The playable disc assembly according to claim 11, wherein the top portion is at least partially flexible.

* * * * *